US009791855B2

(12) United States Patent
Han et al.

(10) Patent No.: US 9,791,855 B2
(45) Date of Patent: Oct. 17, 2017

(54) SEMICONDUCTOR PROCESS MANAGEMENT SYSTEM, SEMICONDUCTOR MANUFACTURING SYSTEM INCLUDING THE SAME, AND METHOD OF MANUFACTURING SEMICONDUCTOR

(71) Applicant: Samsung Electronics Co., Ltd., Suwon-si (KR)

(72) Inventors: Dong-hoon Han, Seoul (KR); Jai-hyung Won, Seoul (KR); Do-hyung Kim, Uijeongbu-si (KR); Sung-hyup Kim, Suwon-si (KR); Ho-jun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 278 days.

(21) Appl. No.: 14/718,116

(22) Filed: May 21, 2015

(65) Prior Publication Data

US 2015/0346709 A1     Dec. 3, 2015

(30) Foreign Application Priority Data

Jun. 3, 2014    (KR) ........................ 10-2014-0067789

(51) Int. Cl.
| | |
|---|---|
| *G05B 19/401* | (2006.01) |
| *H01L 21/67* | (2006.01) |
| *G05B 19/418* | (2006.01) |

(52) U.S. Cl.
CPC ................. *G05B 19/41875* (2013.01); *G05B 2219/31443* (2013.01); *G05B 2219/45031* (2013.01); *G05B 2219/50139* (2013.01); *Y02P 90/20* (2015.11); *Y02P 90/22* (2015.11)

(58) Field of Classification Search
CPC .... G05B 19/41875; G05B 2219/45031; G05B 2219/50139; G05B 2219/31443; Y02P 90/22; Y02P 90/20
See application file for complete search history.

(56) References Cited

U.S. PATENT DOCUMENTS

| | | | | |
|---|---|---|---|---|
| 5,450,346 | A | * | 9/1995 | Krummen ............ G05B 19/058 700/11 |
| 5,536,128 | A | * | 7/1996 | Shimoyashiro ... H01L 21/67161 118/719 |
| 5,854,746 | A | * | 12/1998 | Yamamoto ............. G06Q 10/06 700/106 |

(Continued)

FOREIGN PATENT DOCUMENTS

| | | |
|---|---|---|
| JP | 2002-026092 | 1/2002 |
| JP | 2002-134377 | 5/2002 |

(Continued)

*Primary Examiner* — Ramesh Patel
(74) *Attorney, Agent, or Firm* — Ward and Smith, P.A.

(57) ABSTRACT

A semiconductor process management system is provided. The semiconductor process management system includes a communicator that receives a process recipe from one or more process apparatuses and receives a measured value for each sampling point from one or more measuring apparatus, and a first determination unit that establishes a mutual influence model between the process recipe and the measured value for each sampling point based on the process recipe and the measured value for each sampling point.

20 Claims, 10 Drawing Sheets

(56) References Cited

U.S. PATENT DOCUMENTS

| | | | |
|---|---|---|---|
| 6,556,884 B1 * | 4/2003 | Miller | G05B 19/41875 700/121 |
| 6,684,122 B1 * | 1/2004 | Christian | G05B 19/41875 700/110 |
| 6,725,121 B1 * | 4/2004 | Pasadyn | G05B 19/41865 700/121 |
| 6,790,686 B1 * | 9/2004 | Purdy | G05B 19/41865 438/14 |
| 7,047,099 B2 * | 5/2006 | Shanmugasundram | B24B 49/18 257/E21.525 |
| 7,054,705 B2 * | 5/2006 | Ogawa | H01L 22/20 257/E21.525 |
| 7,127,304 B1 * | 10/2006 | Gould | G05B 13/024 700/121 |
| 7,242,995 B1 * | 7/2007 | Morgenson | G05B 19/418 700/103 |
| 7,356,176 B2 * | 4/2008 | Fujii | G01N 21/8851 250/559.44 |
| 9,607,724 B2 * | 3/2017 | Adler | G21K 7/00 |
| 2002/0165636 A1 * | 11/2002 | Hasan | G05B 15/02 700/121 |
| 2004/0220688 A1 * | 11/2004 | Behrisch | G05B 19/41875 700/96 |
| 2005/0037272 A1 * | 2/2005 | Tanaka | G03F 7/70991 430/30 |
| 2006/0064188 A1 * | 3/2006 | Ushiku | G05B 19/41865 700/96 |
| 2007/0097763 A1 * | 5/2007 | Tokorozuki | H01L 22/20 365/201 |
| 2007/0135957 A1 * | 6/2007 | Ogawa | G05B 17/02 700/109 |
| 2012/0029679 A1 * | 2/2012 | Matsushita | H01L 22/20 700/110 |

FOREIGN PATENT DOCUMENTS

| | | |
|---|---|---|
| KR | 1019950052287 | 7/1997 |
| KR | 1019970051819 | 7/1997 |
| KR | 1020050077869 A | 8/2005 |
| KR | 1020060085290 A | 7/2006 |
| KR | 1020070001872 A | 1/2007 |
| KR | 1020070104073 A | 10/2007 |
| KR | 1020110118927 A1 | 11/2011 |

\* cited by examiner

SEMICONDUCTOR PROCESS MANAGEMENT SYSTEM, SEMICONDUCTOR MANUFACTURING SYSTEM INCLUDING THE SAME, AND METHOD OF MANUFACTURING SEMICONDUCTOR

CROSS-REFERENCE TO RELATED APPLICATION

This application claims priority to Korean Patent Application No. 10-2014-0067789, filed on Jun. 3, 2014, in the Korean Intellectual Property Office, the disclosure of which is incorporated herein in its entirety by reference.

1. TECHNICAL FIELD

The inventive concept relates to a semiconductor process management system, a semiconductor manufacturing system including the semiconductor process management system, and a method of manufacturing a semiconductor by using the semiconductor manufacturing system, and more particularly, to a semiconductor process management system that can increase a process yield.

2. DISCUSSION OF PRIOR ART

In general, a great number of unit processes have to be performed to produce a completed semiconductor product through a series of semiconductor manufacturing processes. Accordingly, a plurality of semiconductor manufacturing apparatuses satisfying high level accuracy (for example, a chemical vapor deposition (CVD) apparatus, a sputtering apparatus, an etching apparatus, a measuring apparatus, etc.) are disposed in a semiconductor production line and perform semiconductor manufacturing processes according to a planned process sequence. Recently, a semiconductor process management system for maximizing the process efficiency of semiconductor process apparatuses performing various processes is required.

SUMMARY

The inventive concept provides a semiconductor process management system that may increase yield in a semiconductor manufacturing process and manufacture a highly reliable semiconductor.

The inventive concept provides a semiconductor manufacturing system including the semiconductor process management system.

The inventive concept also provides a method of manufacturing a semiconductor by using the semiconductor manufacturing system.

According to an aspect of the inventive concept, there is provided a semiconductor manufacturing system including: one or more process apparatuses that receive a process recipe and perform one or more unit processes; one or more measuring apparatus that measure a wafer on which the one or more unit processes have been performed; and a process management system that manages the one or more unit processes, wherein the process management system includes: a communicator that receives the process recipe from the one or more process apparatuses and receives a measured value from the one or more measuring apparatus; and a first determination unit that establishes a mutual influence model between the process recipe and the measured value based on the process recipe and the measured value.

The process management system may further include: a second determination unit that determines whether the unit process is out of specification (hereinafter, referred to as a spec-out), based on the measured value; and a third determination unit that determines the cause of the spec-out of the unit process.

The third determination unit may include a defective apparatus determination unit that determines a defective apparatus having the cause of the spec-out from among the one or more process apparatuses based on the mutual influence model.

The third determination unit may further include a defective process factor determination unit that determines a defective process factor having the cause of the spec-out in the defective apparatus from among a plurality of process factors included in the process recipe based on the mutual influence model.

The process management system may further include a recipe generator that generates a new process recipe based on at least one selected from the mutual influence model and the defective process factor.

The communicator of the process management system may further include a recipe transmitter that transmits the new process recipe to the defective apparatus.

The one or more process apparatuses may include: a mass production process apparatus that performs a mass production process based on a mass production process recipe; and a test process apparatus that performs a test process based on a test process recipe, wherein the first determination unit establishes the mutual influence model based on the mass production process recipe, the test process recipe, a mass production measured value obtained by measuring a wafer on which the mass production process has been performed, and a test measured value obtained by measuring a wafer on which the test process has been performed.

The first determination unit may establish a mutual influence model between the process recipe and the measured value based on a unit process recipe and a unit measured value in the one or more unit processes and accumulation process recipes and accumulation measured values, accumulated in the one or more unit processes.

According to another aspect of the inventive concept, there is provided a semiconductor process management system including: a communicator that receives a process recipe from one or more process apparatuses and receives a measured value for each sampling point from one or more measuring apparatus; and a first determination unit that establishes a mutual influence model between the process recipe and the measured value for each sampling point based on the process recipe and the measured value for each sampling point.

The first determination unit may include: a temporary determination unit that establishes a temporary mutual influence model between a plurality of process factors included in the process recipe and the measured value for each sampling point; and a reliability determination unit that determines whether the temporary mutual influence model is suitable.

The first determination unit may further include a teaching unit that teaches the temporary mutual influence model based on at least one selected from the process recipe, the measured value for each sampling point, and the mutual influence model.

The semiconductor process management system may further include a second determination unit that determines whether a process which is performed by the one or more process apparatuses is out of specification based on the measured value for each sampling point.

The semiconductor process management system may further include a third determination unit that determines the cause of a spec-out of a process which is performed by the one or more process apparatuses.

The third determination unit may include: a defective apparatus determination unit that determines a defective apparatus having the cause of the spec-out from among the one or more process apparatuses based on the mutual influence model; and a defective process factor determination unit that determines a defective process factor having the cause of the spec-out in the defective apparatus from among a plurality of process factors included in the process recipe based on the mutual influence model.

The semiconductor process management system may further include a recipe generator that generates a new process recipe based on the mutual influence model.

According to another aspect of the inventive concept, there is provided a semiconductor manufacturing system including: one or more process apparatuses that receive a process recipe and perform one or more unit processes; one or more measuring apparatus that measure a wafer on which the one or more unit processes have been performed; a process management system that manages the one or more unit processes; and a yield test apparatus that tests whether a wafer, on which all processes in the one or more process apparatuses have been completed, is defective, wherein the process management system includes: a communicator that receives the process recipe from the one or more process apparatuses, receives a measured value from the one or more measuring apparatus, and receives a test result from the yield test apparatus; and a first determination unit that establishes a mutual influence model between the test result and the at least one selected from the process recipe and the measured value based on the test result and the at least one selected from the process recipe and the measured value.

The process management system may further include a second determination unit that determines the cause of a defect of the wafer on which all processes in the one or more process apparatuses have been completed, based on the test result and the mutual influence model.

The second determination unit may include a defective apparatus determination unit that determines a defective apparatus having the cause of a defect from among the one or more process apparatuses based on the mutual influence model.

The second determination unit may further include a defective process factor determination unit that determines a defective process factor having the cause of a defect in the defective apparatus from among a plurality of process factors included in the process recipe based on the mutual influence model.

The semiconductor process management system may further include a recipe generator that generates a new process recipe based on at least one selected from the mutual influence model and the defective process factor.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1A:
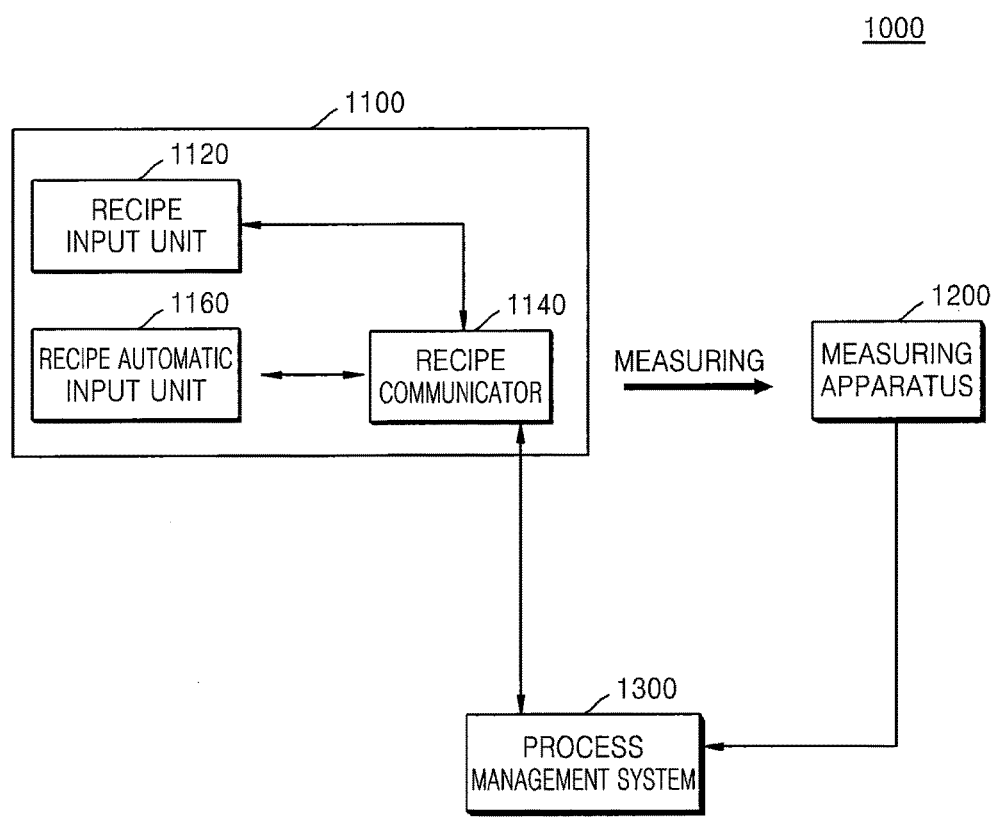
FIGS. 1A and 1B are conceptual diagrams of a semiconductor manufacturing system according to an embodiment of the inventive concept.

As used herein, the term "and/or" includes any and all combinations of one or more of the associated listed items.

Hereinafter, embodiments of the inventive concept will be described in detail with reference to the accompanying drawings. Like reference numerals in the drawings denote like elements, and thus their redundant description will be omitted.

The inventive concept will now be described more fully with reference to the accompanying drawings, in which exemplary embodiments of the inventive concept are shown. The inventive concept may, however, be embodied in many different forms and should not be construed as being limited to the embodiments set forth herein; rather, these embodiments are provided so that this disclosure will be thorough and complete, and will fully convey the inventive concept to those of ordinary skill in the art.

It will be understood that although the terms "first", "second", etc. are used herein to describe members, regions, layers, portions, sections, components, and/or elements in embodiments of the inventive concept, the members, regions, layers, portions, sections, components, and/or elements should not be limited by these terms. These terms are only used to distinguish one member, region, portion, section, component, or element from another member, region, portion, section, component, or element. Thus, a first member, region, portion, section, component, or element described below may also be referred to as a second member, region, portion, section, component, or element without departing from the scope of the inventive concept. For example, a first element may also be referred to as a second element, and similarly, a second element may also be referred to as a first element, without departing from the scope of the inventive concept.

Unless otherwise defined, all terms (including technical and scientific terms) used herein have the same meaning as commonly understood by those of ordinary skill in the art to which the inventive concept pertains. It will also be understood that terms, such as those defined in commonly used dictionaries, should be interpreted as having a meaning that is consistent with their meaning in the context of the relevant art and will not be interpreted in an idealized or overly formal sense unless expressly so defined herein.

When a certain embodiment may be implemented differently, a specific process order may be performed differently from the described order. For example, two consecutively described processes may be performed substantially at the same time or performed in an order opposite to the described order.

In the accompanying drawings, variations from the illustrated shapes as a result, for example, of manufacturing techniques and/or tolerances, are to be expected. Thus, the embodiments of the inventive concept should not be construed as being limited to the particular shapes of regions illustrated herein but may be to include deviations in shapes that result, for example, from a manufacturing process.

Figure 1B:
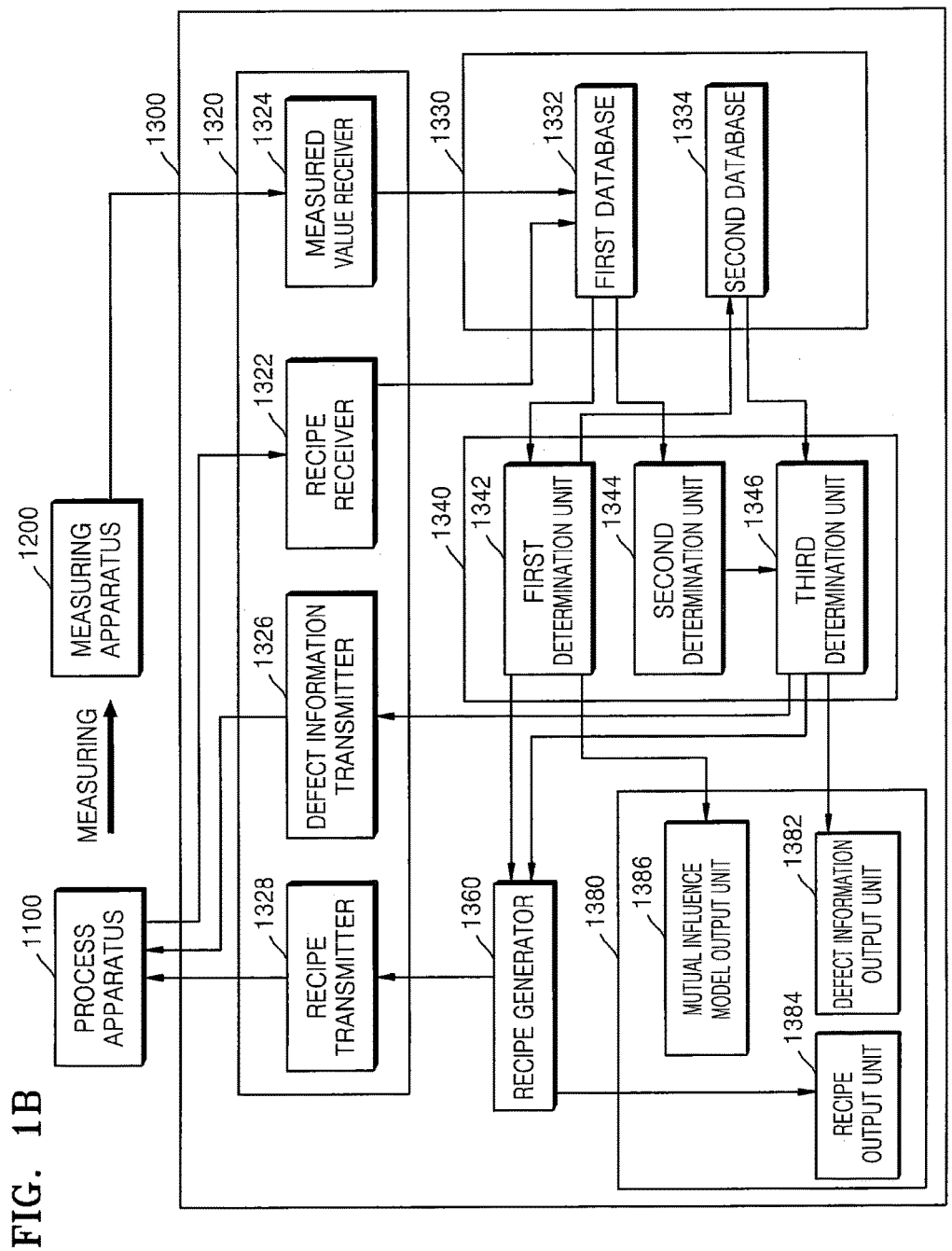

FIGS. 1A and 1B are conceptual diagrams of a semiconductor manufacturing system 1000 according to an embodiment of the inventive concept.

Referring to FIGS. 1A and 1B, the semiconductor manufacturing system 1000 includes a process apparatus 1100 performing a certain unit process on a semiconductor wafer, a measuring apparatus 1200 measuring specifications (for example, the thickness, uniformity, electrical characteristics, and optical characteristics of a deposited layer) of the semiconductor wafer on which the unit process has been completed, and a process management system 1300 managing a semiconductor manufacturing process.

In the present specification, a "wafer" denotes a wafer in a semiconductor manufacturing process step or a wafer on which the semiconductor manufacturing process has been completed. That is, the wafer may include one or more layers (for example, a resist layer, an insulating layer, a conductive layer, etc.) that may be formed on a substrate.

Figure 5:
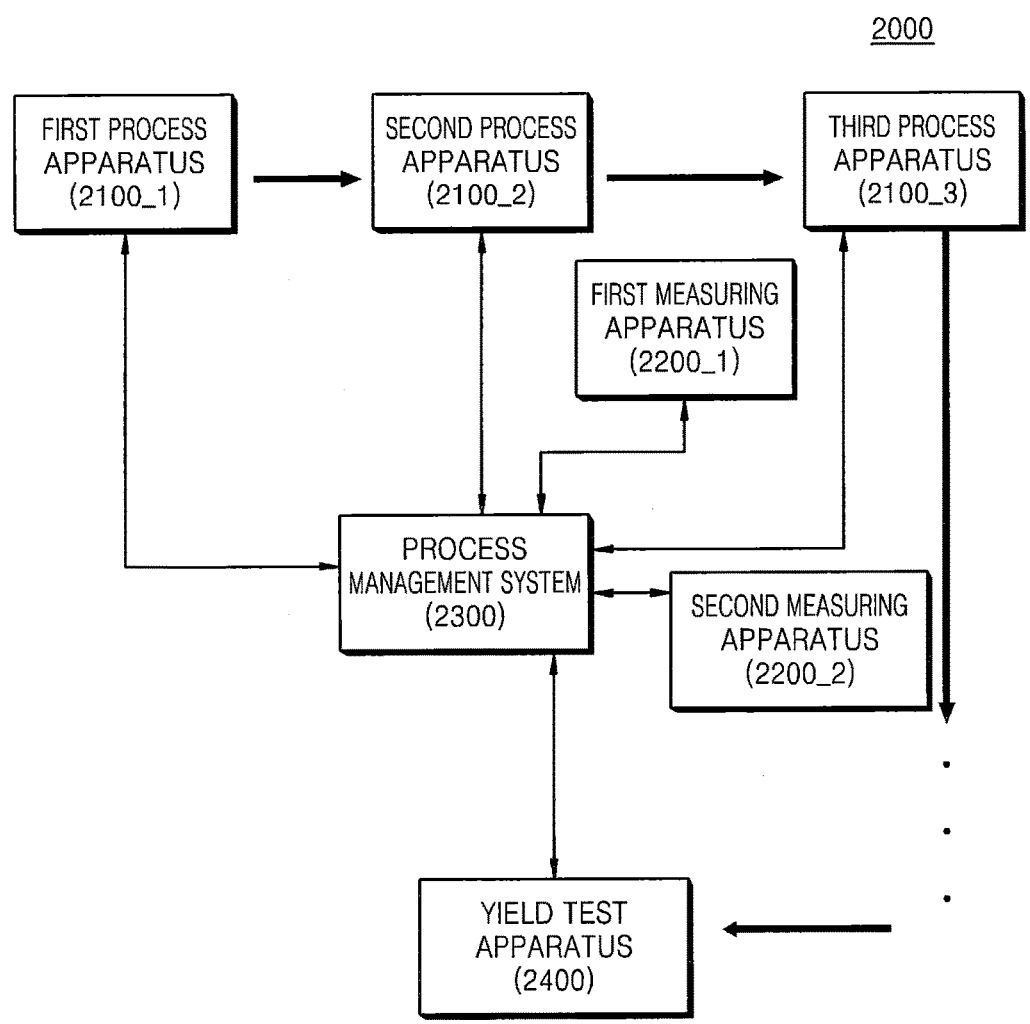
FIG. 5 is a conceptual diagram of a semiconductor manufacturing system according to another embodiment of the inventive concept.

As illustrated, the present embodiment includes only one process apparatus 1100 and only one measuring apparatus 1200. However, the process management system 1300 may communicate with a plurality of process apparatuses 1100 and a plurality of measuring apparatuses 1200, as illustrated in FIG. 5.

The process apparatus 1100 may include a recipe input unit 1120 that receives a process recipe to be performed by the process apparatus 1100, a recipe communicator 1140 that communicates with the process management system 1300 to transmit a process recipe performed by the process apparatus 1100 or receive a new process recipe generated by the process management system 1300, and a recipe automatic input unit 1160 that automatically receives the new process recipe and applies the received new process recipe to a process.

The process recipe is process conditions that are needed for an apparatus when performing a unit process on a semiconductor wafer. In some embodiments, the process recipe may include a plurality of process factors. For example, the process factors may include a temperature and pressure in a process apparatus, a process time, and a density of process gas.

The process apparatus 1100 may receive the process recipe and perform individual unit processes that are needed for manufacturing a semiconductor, e.g., an oxidation process, a photolithography process, an etching process, a deposition process, a doping process, an ashing/strip process, a cleaning process, a planarization process, and the like.

The recipe input unit 1120 may receive a process recipe to be performed by the process apparatus 1100 from an operator of each process and may set process conditions of the process apparatus 1100. Although the recipe input unit 1120 of the present embodiment is a part of the process apparatus 1100, the inventive concept is not limited thereto. For example, the recipe input unit 1120 may be included in an input device or a computer outside the process apparatus 1100 to set process conditions of the process apparatus 1100.

As described below with reference to FIG. 3, the process management system 1300 may generate a new process recipe based on a value measured by the measuring apparatus 1200 to increase a process yield, and an operator of each process may input the new process recipe output from the process management system 1300 to the recipe input unit 1120 of the process apparatus 1100 to form better process conditions.

The recipe communicator 1140 may transmit a process recipe performed on a wafer to the process management system 1300 or may receive a new process recipe generated by the process management system 1300 or defect information (the new process recipe and the defect information will be described later). In this case, a new process recipe generated by the process management system 1300 may be input to the recipe automatic input unit 1160 via the recipe communicator 1140, or may be directly transmitted from the process management system 1300 to the recipe automatic input unit 1160 without transmitting through the recipe communicator 1140.

The measuring apparatus 1200 may measure certain specifications of a wafer (not shown) on which a unit process in the process apparatus 1100 has been completed. For example, when a deposition process is performed by the process apparatus 1100, the measuring apparatus 1200 may measure certain specifications, such as the thickness, uniformity, electrical characteristics, and optical characteristics of a deposited layer. Measured values of the certain specifications may be transmitted to the process management system 1300 via a communicator of the measuring apparatus 1200.

In some embodiments, the process management system 1300 includes a communicator 1320, a database 1330, a determination unit 1340, a recipe generator 1360, and an output unit 1380.

The communicator 1320 may include a recipe receiver 1322, a measured value receiver 1324, a defect information transmitter 1326, and a recipe transmitter 1328.

The process management system 1300 may communicate with the process apparatus 1100 and the measuring apparatus 1200 via the communicator 1320.

In detail, the recipe receiver 1322 receives a process recipe used in the process apparatus 1100, and the measured value receiver 1324 receives a value measured by the measuring apparatus 1200 and stores the received value in the database 1330. The defect information transmitter 1326 may transmit defect information obtained by the determination of the process management system 1300 to the process apparatus 1100, and the recipe transmitter 1328 may transmit a new process recipe generated by the process management system 1300 to the process apparatus 1100. These operations will be described later.

The database 1330 includes a first database 1332 that stores a process recipe received from the process apparatus 1100 and a measured value received from the measuring apparatus 1200, and a second database 1334 that stores a mutual influence model established by a first determination unit 1342 (the mutual influence model will be described later with reference to FIG. 2).

Although the database 1330 of the present embodiment is divided into the first database 1332 and the second database 1334, this division is for convenience of explanation and the first database 1332 and the second database 1334 may be formed as one database physically.

The present embodiment include only one process apparatus 1100 is illustrated in. However, when unit processes are respectively performed by a plurality of process apparatuses as illustrated in FIG. 5, about 20 wafers to about 25 wafers may form one lot as a unit and each unit process may be performed for each lot. In this case, each of the plurality of process apparatuses may transmit a lot number of wafers (or a wafer number) in addition to a process recipe to the process management system 1300, and the first database 1332 may also store a process recipe and a measure value which correspond to the lot number of wafers (or the wafer number).

The determination unit 1340 may generate data that is required for process management, based on data such as measured values accumulated in the database 1330. In the present embodiment, the determination unit 1340 includes the first determination unit 1342, a second determination unit 1344, and a third determination unit 1346. However, this is for convenience of explanation, and the first determination unit 1342, the second determination unit 1344, and the third determination unit 1346 may be formed as one data processing device physically.

Based on process recipes and measured values, accumulated in the first database 1332, the first determination unit 1342 may establish a mutual influence model between the process recipes and the measured values. The first determination unit 1342 may include a temporary determination unit that establishes a temporary mutual influence model between the process recipes and the measured values, a reliability determination unit that determines whether the temporary mutual influence model is suitable, and a teaching unit that teaches the temporary mutual influence model based on at least one selected from the group consisting of the process recipes, the measured values, and the mutual influence model. The first determination unit 1342 will be described in detail with reference to FIGS. 2C and 2D later.

The second determination unit 1344 determines whether each unit process is out of specification (hereinafter, referred to as "spec-out"), based on measured values stored in the first database 1332. "Spec-out" may correspond to a case where the measured values are out of a range between an upper control limit (UCL) of a target specification and a lower control limit (LCL) of the target specification. The UCL and the LCL may be arbitrarily designated according to need, and only any one of the UCL and LCL may be designated in some cases.

If it is determined that a unit process is spec-out, the third determination unit 1346 determines the cause of the spec-out of the unit process. The third determination unit 1346 may include a defective process factor determination unit that determines a defective process factor that causes the spec-out from among a plurality of process factors (e.g., a temperature and pressure in a process apparatus, a process time, and a density of process gas) included in a process recipe, based on the mutual influence model stored in the second database 1334. In addition, when a spec-out occurs after a plurality of unit processes are performed, the cause of the spec-out may not occur in a unit process just before measuring is performed, but may occur in a unit process performed before then. Thus, the third determination unit 1346 may further include a defective apparatus determination unit that determines a defective apparatus having the cause of the spec-out from among a plurality of process apparatuses, based on the mutual influence model stored in the second database 1334.

Information about at least one selected from the defective process factor and the defective apparatus, determined by the third determination unit 1346, may be provided to the defect information transmitter 1326 of the communicator 1320, the recipe generator 1360, and a defect information output unit 1382 of the output unit 1380.

The defect information transmitter 1326 may transmit the received information about the at least one to the process apparatus 1100.

The recipe generator 1360 may generate a new process recipe that may increase a process yield, based on at least one selected from a mutual influence model established by the first determination unit 1342 and a defective process factor determined by the third determination unit 1346.

The new process recipe generated by the recipe generator 1360 may be provided to the recipe transmitter 1328 of the communicator 1320 and a recipe output unit 1384 of the output unit 1380.

The output unit 1380 may include a mutual influence model output unit 1386 that outputs the mutual influence model established in the first determination unit 1342, the defect information output unit 1382 that outputs the information about at least one selected from the defective apparatus and the defective process factor, determined by the third determination unit 1346, and the recipe output unit 1384 that outputs the new process recipe generated by the recipe generator 1360.

Figure 2A:
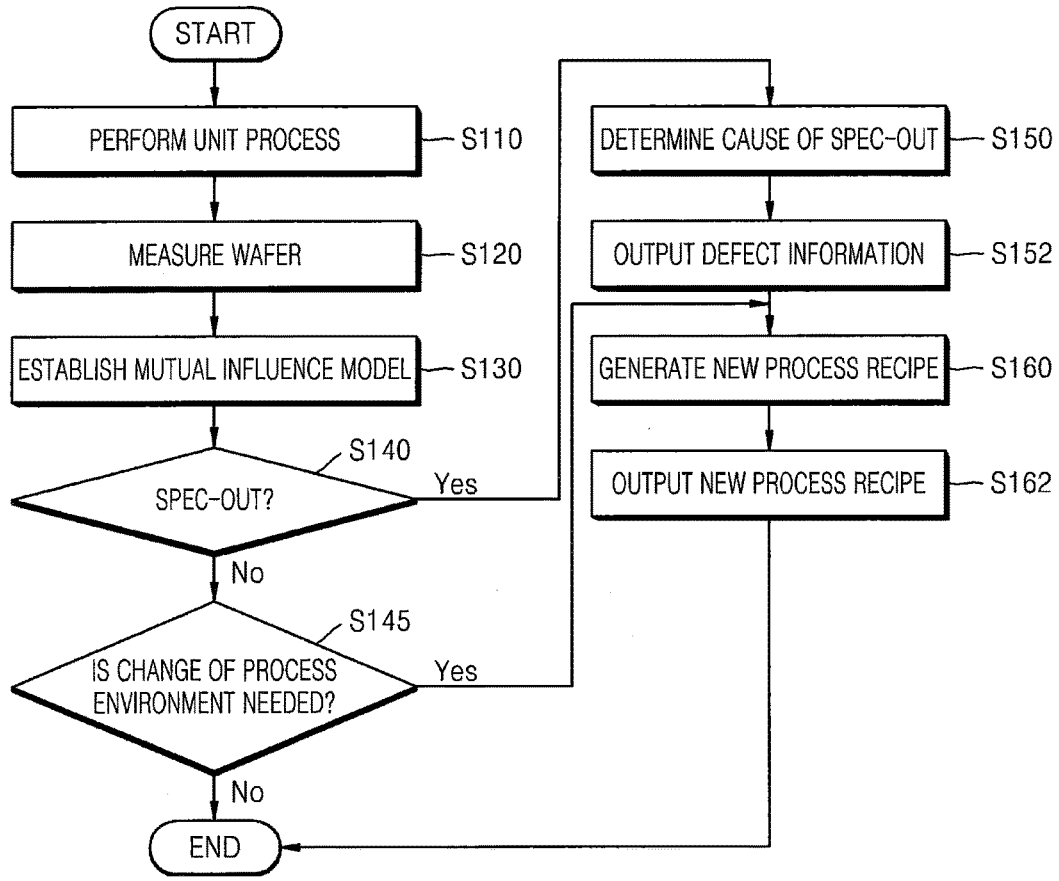
FIG. 2A is a flowchart of a method of manufacturing a semiconductor, according to an embodiment of the inventive concept.
Figure 2B:
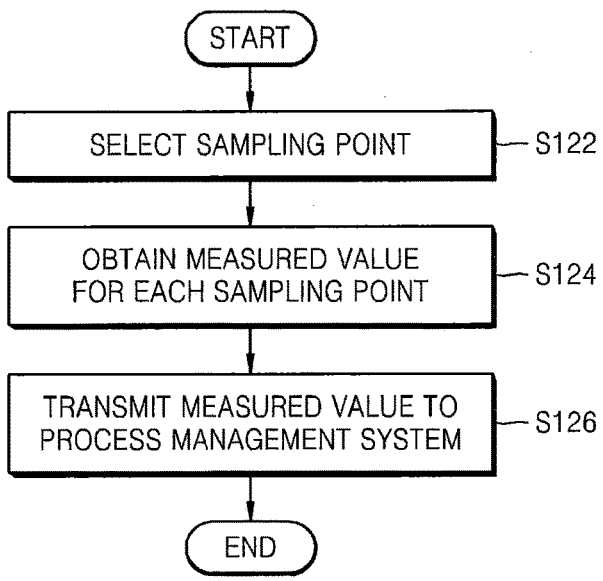
FIG. 2B is a flowchart of a method of measuring a wafer in the method of manufacturing a semiconductor.
Figure 2C:
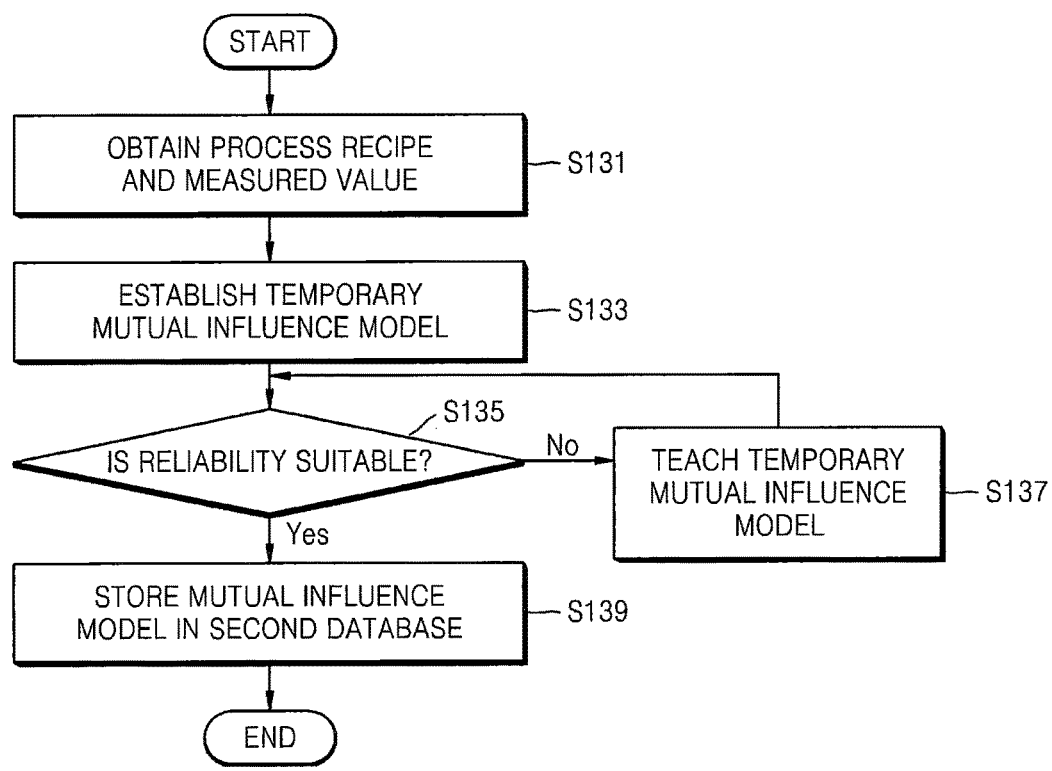
FIGS. 2C and 2D are flowcharts of a method of establishing a mutual influence model in the method of manufacturing a semiconductor.
Figure 2D:
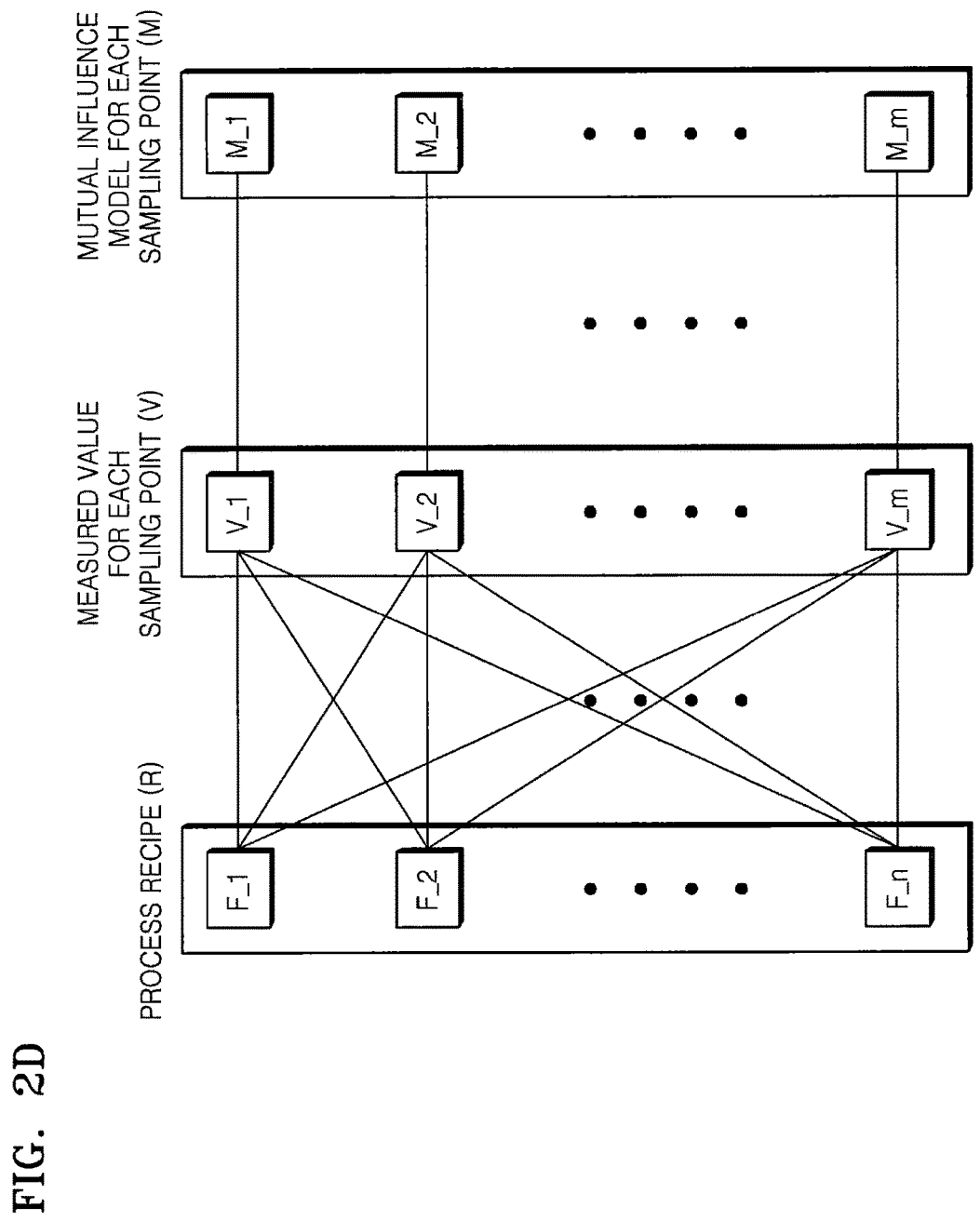

FIG. 2A is a flowchart of a method of manufacturing a semiconductor, according to an embodiment of the inventive concept. FIG. 2B is a flowchart of a method of measuring a wafer in the method of manufacturing a semiconductor. FIGS. 2C and 2D are flowcharts of a method of establishing a mutual influence model in the method of manufacturing a semiconductor.

Some elements of the semiconductor manufacturing system 1000 illustrated in FIGS. 1A and 1B may be referred in each operation to be described with reference to FIGS. 2A to 2D.

Referring to FIGS. 2A to 2D, the method of manufacturing a semiconductor includes receiving a process recipe to perform one or more unit processes on a wafer (operation S110), measuring the wafer, on which the unit processes have been performed, to obtain measured values (operation S120), establishing a mutual influence model between the process recipe and the measured values (operation S130), and determining whether the unit processes are spec-out (operation S140).

If it is determined that the unit processes are spec-out, the cause of the spec-out (operation S150) may be additionally determined and information about a defective apparatus and a defective process factor, which provide the cause of the spec-out, may be additionally output (operation S152), and after operation S152, a new process recipe (operation S160) may be additionally generated and the new process recipe (operation S162) may be additionally output according to need.

Furthermore, even if it is determined that the unit processes are not spec-out, it is determined whether a change of the current process environment, such as a change of process trend, is needed (operation S145), and after operation S145, a new process recipe (operation S160) may be additionally generated and the new process recipe may be additionally output (operation S162).

In the receiving of a process recipe to perform one or more unit processes on a wafer (operation S110), the process apparatus 1100 receives a process recipe. The process recipe may be input to the process apparatus 1100 via the recipe input unit 1120 of the process apparatus 1100.

In some embodiments, the process recipe may include a plurality of process factors (e.g., a temperature and pressure in a process apparatus, a process time, and a density of process gas). The process recipe is not limited to a process recipe for mass production, which is used to mass produce a semiconductor device, and may be a process recipe for testing, which may be applied to a test wafer.

The process apparatus 1100 performs a unit process on the wafer, i.e., a wafer for mass production or a test wafer, after receiving the process recipe. When the wafer is a wafer for mass production, the process recipe that is input to the process apparatus 1100 may be a process recipe for mass production. When the wafer is a test wafer, the process recipe that is input to the process apparatus 1100 may be a process recipe for testing. The process apparatus 1100 may transmit the process recipe performed in the unit process to the process management system 1300, and the process management system 1300 may receive the process recipe and store the received process recipe in the first database 1332.

The measuring of the wafer (operation S120) may be performed to measure a certain specification (e.g., line, width, thickness, uniformity, etc.) of the wafer on which the unit process has been performed.

In some embodiments, the measuring of the wafer (operations S120) may include selecting a certain position on the wafer as a sampling point (operation S122), obtaining a measured value by measuring the sampling point (operation S124), and transmitting the measured value to the process management system 1300 (operation S126). The process management system 1300 may receive the measured value and store the received measured value in the first database 1332.

The establishing of the mutual influence model (operation S130) may include obtaining a process recipe stored in the first database 1332 and a measured value for the sampling point (operation S131), establishing a temporary mutual influence model between the process recipe and the measured value for the sampling point (operation S133), and determining the reliability of the temporary mutual influence model (operation S135).

Below, a "model" described in the present specification corresponds to a concept including a non-modeling approach, such as a decision tree analysis algorithm, as well as a modeling approach, such as a neural network algorithm.

A "mutual influence model" denotes a mutual influence model determined to be suitable in the determining of the reliability (operation S135), and a "temporary mutual influence model" denotes a mutual influence model in an operation before the determining of the reliability (operation S135).

In more detail, a mutual influence model determined to be suitable in the determining of the reliability (operation S135) is stored in the second database 1334. If it is determined that the temporary mutual influence model is not suitable, the temporary mutual influence model based on at least one selected from the process recipe stored in the first database 1332, the measured value stored in the first database 1332, and the mutual influence model stored in the second database 1334 (operation S137) may be additionally taught. The determining of the reliability (operation S135) is performed once again on the taught mutual influence model. That is, only a mutual influence model determined to be suitable in the determining of the reliability (operation S135) is stored in the second database 1334.

In some embodiments, the establishing of the mutual influence model (operation S130) may include establishing a mutual influence model M between a process recipe R and a measured value V for each sampling point, as illustrated in FIG. 2D. For example, based on a plurality of process factors $F\_1, F\_2, \ldots$ and $F\_n$ included in the process recipe R and a measured value $V\_1$ of a first point, a mutual influence model $M\_1$ between the process recipe R and the measured value $V\_1$ of the first point is established. Similarly, mutual influence models $M\_2, \ldots,$ and $M\_m$ for measured values $V\_2, \ldots,$ and $V\_m$ of second through m-th points, respectively, may be established.

When the mutual influence model M between the process recipe R and the measured value V for each sampling point is established in this manner, a causal relationship that may occur only in a certain point of a wafer may be easily analyzed, and thus, effective process management is possible.

The establishing of the temporary mutual influence model (operation S133) and the teaching of the temporary mutual influence model (operation S133) may be performed through various algorithms, such as a multiple linear regression algorithm, a multiple nonlinear regression algorithm, a neural network algorithm, a support vector regression algorithm, a K nearest neighbor (KNN) regression algorithm, a design of experiment (DOE) analysis algorithm, and the like.

The determining of the reliability (operation S135) may be performed through various algorithms, such as a Hotelling's T square analysis algorithm, a Gaussian density estimator algorithm, a principal component analysis (PCA) algorithm, a novelty detection (ND) algorithm, a score plot analysis algorithm, a partial least squares-discriminant analysis (PLS-DA) algorithm, a hierarchical cluster analysis (HCA) algorithm, a partial least squares (PLS) regression algorithm, a support vector machine (SVM) algorithm, a fuzzy logic algorithm, a K-means clustering algorithm, a mixture of Gaussian (MoG) algorithm, a K-nearest neighbor (K-NN) algorithm, a support vector data description (SVDD) algorithm, and the like.

In the determining whether the unit processes are spec-out (operation S140), whether each unit process is spec-out may be determined for each sampling point based on a measured value for each sampling point. If it is determined that a certain unit process is spec-out, the cause of the spec-out of the certain unit process is determined (operation S150).

The determining of the cause of the spec-out (operation S150) may include determining a defective process factor having the cause of the spec-out from among a plurality of process factors (e.g., a temperature and pressure in a process apparatus, a process time, and a density of process gas) included in a process recipe, based on a mutual influence model stored in the second database 1334. When a spec-out occurs after a plurality of unit processes are performed, the cause of the spec-out may not occur in a unit process just before measuring is performed, but may occur in a unit process performed before then. Thus, the method of manufacturing a semiconductor may further include determining a defective apparatus having the cause of the spec-out from among a plurality of process apparatuses, based on the mutual influence model stored in the second database 1334.

If the cause of the spec-out is determined, information about a defective apparatus and a defective process factor, which provide the cause of the spec-out, may be output via the output unit 1380 of the process management apparatus 1300 (operation S152).

The generating of a new process recipe (operation S160) may include generating a new process recipe that may increase a process yield, based on at least one selected from the mutual influence model established in the establishing of a mutual influence model (operation S130) and the defective process factor determined in the determining of the cause of the spec-out (operation S150). The new process recipe may be output via the output unit 1380 of the process management apparatus 1300.

Figure 3:
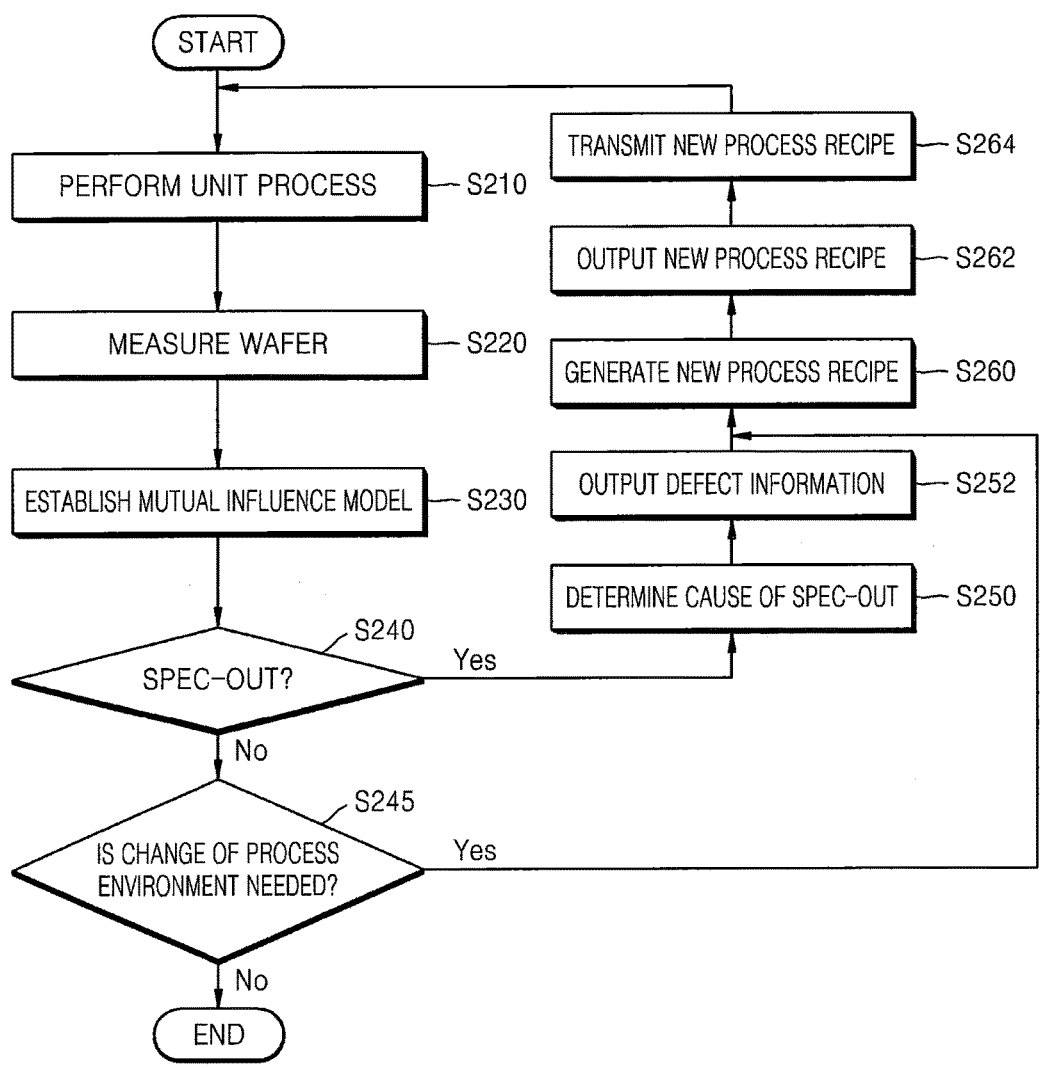
FIG. 3 is a flowchart of a method of manufacturing a semiconductor, according to another embodiment of the inventive concept.

FIG. 3 is a flowchart of a method of manufacturing a semiconductor, according to another embodiment of the inventive concept. In FIG. 3, a reference numeral that is the same as that of FIGS. 1A to 2E denotes an element that is the same as that of FIGS. 1A to 2E, and thus, a repeated description thereof is omitted. In addition, some elements of the semiconductor manufacturing system 1000 illustrated in FIGS. 1A and 1B may be referred in each operation to be described with reference to FIG. 3.

Referring to FIG. 3, the method of manufacturing a semiconductor, according to another embodiment, includes receiving a process recipe to perform one or more unit processes on a wafer (operation S210), measuring the wafer, on which the unit processes have been performed, to obtain measured values (operation S220), establishing a mutual influence model between the process recipe and the measured values (operation S230), and determining whether the unit processes are spec-out (operation S240).

If it is determined that the unit processes are spec-out, the cause of the spec-out (operation S250) may be additionally determined and information about a defective apparatus and a defective process factor, which provide the cause of the spec-out may be additionally output (operation S252). After operation S252, a new process recipe (operation S260) may be additionally generated, the new process recipe (operation S262) may be additionally output, and the new process recipe may be additionally transmitted to the process apparatus 1100 (operation S264) according to need.

Furthermore, even if it is determined that the unit processes are not spec-out, it may be performed determining whether a change of the current process environment, such as a change of process trend, is needed (operation S245), and after operation S245, a new process recipe (operation S260) may be additionally generated, the new process recipe may be additionally output (operation S262), and the new process recipe may be additionally transmitted to the process apparatus 1100 (operation S264).

The measuring of the wafer (operation S220), the establishing of the mutual influence model (operation S230), the determining of whether the unit processes are spec-out (operation S240), the determining of the cause of the spec-out (operation S250), the outputting of the information (operation S252), the generating of the new process recipe (operation S260), and the outputting of the new process recipe (operation S262) may be substantially the same as the measuring of the wafer (operation S120), the establishing of the mutual influence model (operation S130), the determining of whether the unit processes are spec-out (operation S140), the determining of the cause of the spec-out (operation S150), the outputting of the information (operation S152), the generating of the new process recipe (operation S160), and the outputting of the new process recipe (operation S162), respectively, described with reference to FIGS. 2A to 2D. In the present embodiment, the receiving of the process recipe to perform one or more unit processes on a wafer (operation S210) and the transmitting of the new process recipe to the process apparatus 1100 (operation S264) are mainly described.

In the receiving of a process recipe to perform one or more unit processes on a wafer (operation S210), the process apparatus 1100 receives a process recipe.

The process apparatus 1100 may perform each unit process based on a process recipe input to the recipe input unit 1120 by an operator. Alternatively, when the recipe transmitter 1328 of the process management system 1300 transmits a new process recipe, the recipe automatic input unit 1160 of the process apparatus 1100 may automatically receive the new process recipe and perform each unit process based on the new process recipe.

If it is determined that a certain unit process is spec-out in operation S240, the cause of the spec-out of the certain unit process is determined (operation S250), a new process recipe is generated (operation S260), and then the new process recipe may be transmitted to the process apparatus 1100. As described above, the process apparatus 1100 may perform each unit process based on the new process recipe.

Figure 4:
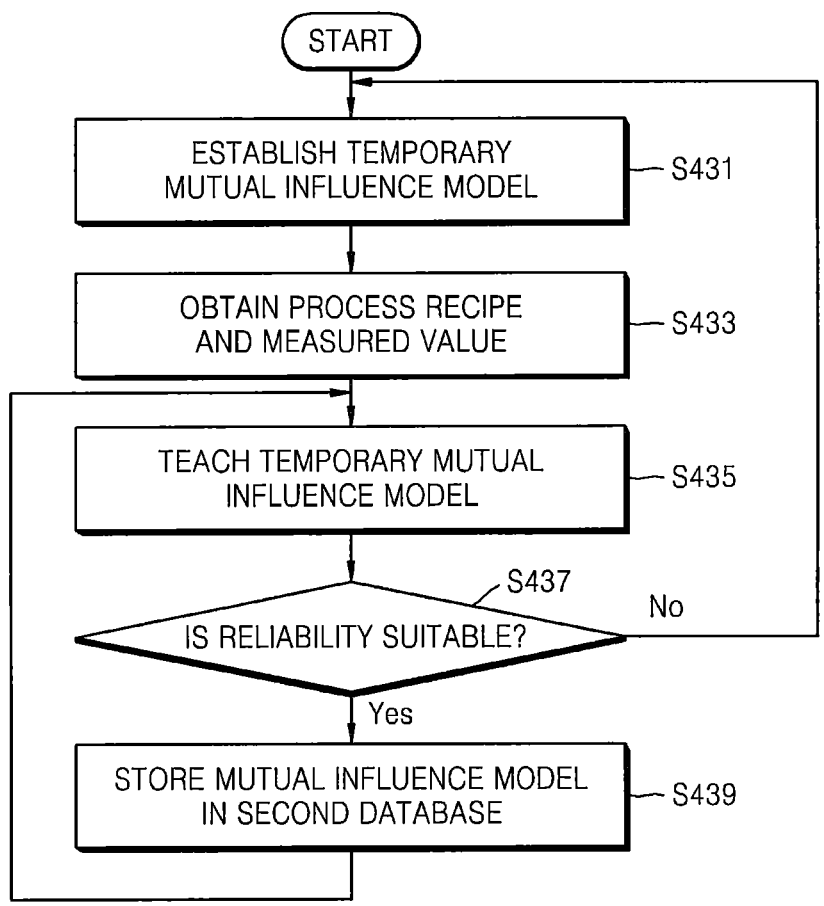
FIG. 4 is a flowchart of a method of establishing a mutual influence model, according to another embodiment of the inventive concept.

FIG. 4 is a flowchart of a method of establishing a mutual influence model, according to another embodiment of the inventive concept. Some elements of the semiconductor manufacturing system 1000 illustrated in FIGS. 1A and 1B may be referred in each operation to be described with reference to FIG. 4.

Referring to FIG. 4, the method of establishing a mutual influence model includes establishing a temporary mutual influence model between a process recipe and a measured value (operation S431), obtaining the process recipe and the measured value in real time (operation S433), teaching the temporary mutual influence model (operation S435), determining the reliability of the taught temporary mutual influence model (operation S437), and storing a temporary mutual influence model determined to be suitable in the determining of the reliability in the second database (operation S439).

In the establishing of the temporary mutual influence model (operation S431), the temporary mutual influence model between the process recipe and the measured value is established based on a process recipe and a measured value, accumulated in the first database 1332.

Below, a "mutual influence model" denotes a mutual influence model determined to be suitable in the determining of the reliability (operation S437) and a "temporary mutual influence model" denotes a mutual influence model in an operation before the determining of the reliability (operation S435). Furthermore, a "temporary mutual influence model" is a mutual influence model determined to be suitable in the determining of the reliability (operation S437) and includes a mutual influence model returned to the teaching (operation S435) via the storing (operation S439).

In the obtaining of the process recipe and the measured value (operation S433), a process recite, which is transmitted from the process apparatus 1100 in real time, and a measured value, which is transmitted from the measuring apparatus 1200 in real time, may be obtained.

That is, in the obtaining of the process recipe and the measured value (operation S433), a process recipe applied to a process after establishing the temporary mutual influence model and a value measured after establishing the temporary mutual influence model are obtained.

For example, when a unit process is performed on wafers of a first lot and wafers of a second lot in order in the process apparatus 1100 for performing the unit process, the temporary mutual influence model is established based on a process recipe and a measured value, which correspond to the wafers of the first lot. In the present embodiment, the obtaining of the process recipe and the measured value (operation S433) denotes obtaining a process recipe and a measured value, which correspond to the wafers of the second lot, after establishing the temporary mutual influence model.

In the teaching (operation S435), the temporary mutual influence model is taught based on the process recipe and the measured value, obtained in the obtaining of the process recipe and the measured value (operation S433).

In the determining of the reliability (operation S437), the reliability of the taught mutual influence model is determined. If it is determined that the taught mutual influence model is not suitable in the determining of the reliability (operation S437), a new temporal mutual influence model between a process recipe and a measured value may be established, based on a process recipe and a measured value, accumulated in the first database 1332.

In the storing (operation S439), a mutual influence model determined to be suitable in the determining of the reliability (operation S437) may be stored in the second database 1334. The mutual influence model may return to the teaching (operation S435) via the storing (operation S439).

For example, the establishing of the temporary mutual influence model (operation S431) and the teaching (operation S435) may be performed through various algorithms, such as a multiple linear regression algorithm, a multiple nonlinear regression algorithm, a neural network algorithm, a support vector regression algorithm, a KNN regression algorithm, a DOE analysis algorithm, and the like.

The determining of the reliability (operation S437) may be performed through various algorithms, such as a Hotelling's T square analysis algorithm, a Gaussian density estimator algorithm, a PCA algorithm, an ND algorithm, a score plot analysis algorithm, a PLS-DA algorithm, an HCA algorithm, a PLS regression algorithm, an SVM algorithm, a fuzzy logic algorithm, a K-means clustering algorithm, an MoG algorithm, a K-NN algorithm, an SVDD algorithm, and the like.

FIG. 5 is a conceptual diagram of a semiconductor manufacturing system 2000 according to another embodiment of the inventive concept. In FIG. 5, a reference numeral that is the same as that of FIGS. 1A to 4 denotes an element that is the same as that of FIGS. 1A to 4, and thus, a repeated description thereof is omitted.

Referring to FIG. 5, the semiconductor manufacturing system 2000 includes a plurality of process apparatuses, i.e., first through third apparatuses 2100_1, 2100_2, and 2100_3, performing respective unit processes on a semiconductor wafer, a plurality of measuring apparatuses, i.e., first and second measuring apparatuses 2200_1 and 2200_2, measuring a certain specification of the semiconductor wafer in which the unit processes have been completed, and a process management system 2300 managing a semiconductor manufacturing process, and a yield test device 2400.

Although three process apparatuses (the first through third 2100_1, 2100_2, and 2100_3) and two measuring apparatuses (the first and second 2200_1 and 2200_2) are illustrated in the present embodiment of FIG. 5, the number of process apparatuses and the number of measuring apparatuses are not limited thereto.

Each of the first through third process apparatuses 2100_1, 2100_2, and 2100_3, each of the first and second measuring apparatuses 2200_1 and 2200_2, and the process management system 2300 may have similar configurations to the process apparatus 1100, the measuring apparatus 1200, and the process management system 1300, respectively, described with reference to FIGS. 1A and 1B. Thus, detailed descriptions of the configurations of the first through third process apparatuses 2100_1, 2100_2, and 2100_3, the first and second measuring apparatuses 2200_1 and 2200_2, and the process management system 2300 are omitted.

Below, the semiconductor manufacturing system 2000 according to the present embodiment is exemplarily described where the first process apparatus 2100_1 is an etching apparatus, the second process apparatus 2100_2 is a deposition apparatus, and the third process apparatus 2100_3 is a planarization apparatus.

The first process apparatus 2100_1 performs an etching process based on a first process recipe. The first process recipe may include a plurality of process factors that are needed for the etching process. The first process recipe is transmitted to the process management system 2300 and is stored in a first database of the process management system 2300.

The wafer, on which the etching process has been performed, in the first process apparatus 2100_1 is transferred to the second process apparatus 2100_2. The second process apparatus 2100_2 performs a deposition process based on a second process recipe.

For example, the second process apparatus 2100_2 may be a deposition apparatus using plasma. When the second process apparatus 2100_2 is a deposition apparatus using plasma, the second process recipe may include a plurality of process factors, such as a temperature and pressure in a reaction chamber, a supply time of a reaction gas, and the like. The second process recipe is transmitted to the process management system 2300 and is stored in the first database of the process management system 2300.

The first measuring apparatus 2200_1 measures a certain specification of a wafer, on which a deposition process has been performed by the second process apparatus 2100_2. For example, the first measuring apparatus 2200_1 may measure the thickness (hereinafter, referred to as a first measured value) of a layer deposited by the second process apparatus 2100_2.

The first measured value is transmitted to the process management system 2300 and is stored in the first database of the process management system 2300.

The process management system 2300 may establish a first mutual influence model between at least one selected from the first process recipe and the second process recipe and the first measured value, based on the at least one selected from the first process recipe and the second process recipe and the first measured value. The first mutual influence model may be stored in a second database of the process management system 2300.

When the first measured value is spec-out, the process management system 2300 determines the cause of the spec-out based on the first mutual influence model.

Specifically, it may be determined which one of the first and second process apparatuses 2100_1 and 2100_2 is a defective apparatus and which one of a plurality of process factors included in the first and second process recipes is a defective process factor.

Furthermore, when the first measured value is spec-out, the process management system 2300 may generate a new process recipe based on at least one selected from the first mutual influence model and the defective process factor and transmit the new process recipe to a defective apparatus.

For example, when it is determined that as the cause of the spec-out, the second process apparatus 2100_2 is a defective apparatus and the temperature in a reaction chamber (not shown) of the second process apparatus 2100_2 is a defective process factor, the process management system 2300 may generate a new second process recipe including a temperature value of the inside of a new reaction chamber, based on the first mutual influence model, and transmit the generated new second process recipe to the second process apparatus 2100_2 that is a defective apparatus.

The third process apparatus 2100_3 performs a planarization process based on a third process recipe.

For example, the third process apparatus 2100_3 may be a chemical mechanical polishing (CMP) apparatus.

The CMP apparatus may include a polishing head that adsorbs a wafer and presses the wafer by using a predetermined pressure while moving up and down as well as rotating at a high speed, and a plate that supports a wafer at a lower side thereof and rotates at a low speed, so that the wafer adsorbed on the polishing head may be ground, and has a conditioner mounted on the upper surface of the plate.

In this case, the third recipe may include a plurality of process factors, such as revolutions per minute (RPM) and pressure of the polishing head, RPM of the conditioner, and the like.

The third process recipe is transmitted to the process management system 2300 and is stored in the first database of the process management system 2300.

The second measuring apparatus 2200_2 measures a certain specification of a wafer, on which a CMP process has been performed by the third process apparatus 2100_3. For example, the second measuring apparatus 2300_2 may measure the uniformity (hereinafter, referred to as a second measured value) of the wafer.

The second measured value is transmitted to the process management system 2300 and is stored in the first database of the process management system 2300.

The process management system 2300 may establish a second mutual influence model between at least one selected from the first through third process recipes and the second measured value, based on the at least one selected from the first through third process recipes and the second measured value. The second mutual influence model may be stored in the second database of the process management system 2300.

When the second measured value is spec-out, the process management system 2300 determines the cause of the spec-out based on the second mutual influence model.

Specifically, it may be determined which one of the first through third process apparatuses 2100_1 to 2100_2 is a defective apparatus and which one of a plurality of process factors included in the first through third process recipes is a defective process factor.

Furthermore, when the second measured value is spec-out, the process management system 2300 may generate a new process recipe based on the second mutual influence model and transmit the new process recipe to a defective apparatus.

For example, when it is determined that as the cause of the spec-out, the third process apparatus 2100_3 is a defective apparatus and the RPM (the third process recipe) of the conditioner of the third process apparatus 2100_3 is a defective process factor, the process management system 2300 may generate a new third process recipe including an RPM value of a new conditioner and transmit the generated new third process recipe to the third process apparatus 2100_2 that is a defective apparatus.

The yield test apparatus 2400 may test whether a wafer, on which all processes required for manufacturing a semiconductor have been completed, is defective.

In some embodiments, the yield test apparatus 2400 may transmit a test result to the process management system 2300 after testing whether the wafer is defective. Whether the wafer is defective may be tested for each sampling point.

The process management system 2300 may establish a mutual influence model between a process recipe and the test result, based on the test result received from the yield test apparatus 2400.

Specifically, the process management system 2300 may establish a third mutual influence model between the test result and the at least one selected from the first through third process recipes, the first measured value, and the second measured value, based on the test result and the at least one selected from the first through third recipes, the first measured value, and the second measured value.

Also, the process management system 2300 may determine the cause of a defect of the wafer based on the test result and the third mutual influence model. Specifically, it may be determined which one of the first through third process apparatuses 2100_1 to 2100_3 was the cause of a defect and which one of a plurality of process factors including the first through third processes was the cause of a defect.

After determining the cause of a defect of the wafer, the process management system 2300 may generate a new process recipe based on the third mutual influence model and transmit the generated new process recipe to a process apparatus having the cause of a detect.

In some embodiments, the process management system 2300 may reset a control upper limit or a control lower limit of a measured value that is measured in each of the plurality of measuring apparatuses (the first and second measuring apparatuses 2200_1 and 2200_2), based on the third mutual influence model.

For example, in the case where a plurality of wafer defects are detected when the first measured value is 195 nm or more in the second process apparatus 2100_2, and the range of an existing specification of the first measured value is from about 100 nm to about 200 nm, the process management system 2300 may reset the current spec-in range of the first measured value to about 100 nm to about 190 nm based on the third mutual influence model.

When a test result of the yield test apparatus 2400 is transmitted to the process management system 2300 as described above and the third mutual influence model is established based on the test result, the cause of a defect of the wafer may be determined even though a measured value in each unit process is not in the range of a specification (i.e., spec-in range), and thus, an effective process management may be performed.

Figure 6:
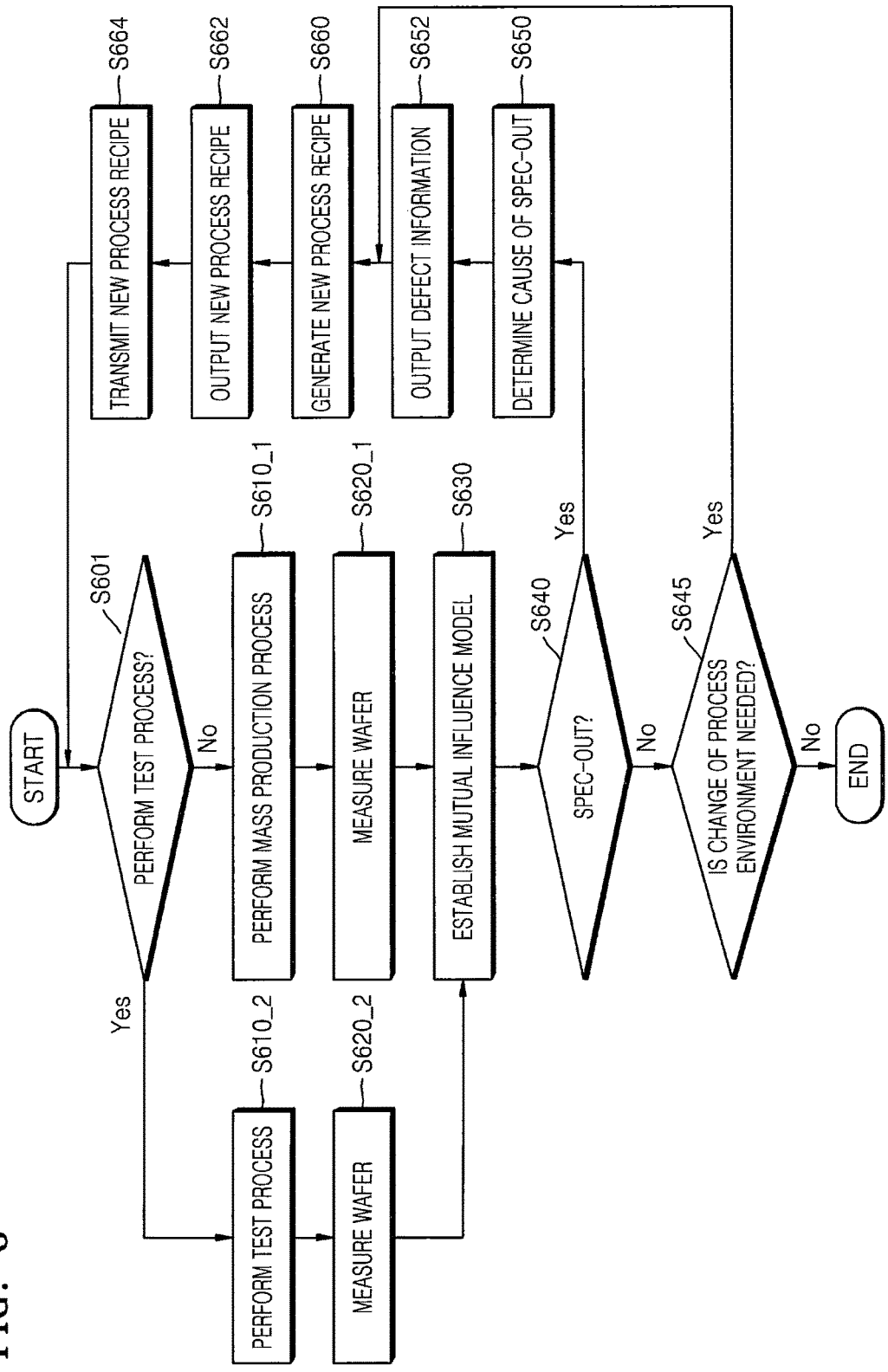
FIG. 6 is a flowchart of a method of manufacturing a semiconductor, according to another embodiment of the inventive concept.

FIG. 6 is a flowchart of a method of manufacturing a semiconductor, according to another embodiment of the inventive concept. In FIG. 6, a reference numeral that is the same as that of FIGS. 1A to 5 denotes an element that is the same as that of FIGS. 1A to 5, and thus, a repeated description thereof is omitted. In addition, some elements of the semiconductor manufacturing system 1000 illustrated in FIGS. 1A and 1B may be referred in each operation to be described with reference to FIG. 6.

Performing a mass production process (operation S610_1), measuring a wafer (operation S620_1), determining whether a unit process is spec-out (operation S640), determining whether a change of a process environment is needed (operation S645), determining the cause of the spec-out (operation S650), outputting defect information (operation S652), generating a new process recipe (operation S660), outputting the new process recipe (operation S662), and transmitting the new process recipe to a process apparatus (operation S664), which are to be described with reference to FIG. 6, may be substantially the same as the receiving of the process recipe to perform one or more unit processes on a wafer (operation S210), the measuring of the wafer (operation S220), the determining of whether the unit processes are spec-out (operation S240), the determining of whether a change of the current process environment is needed (operation S245), determining the cause of the spec-out (operation S250), the outputting of the defect information (operation S252), the generating of the new process recipe (operation S260), the outputting of the new process recipe (operation S262), and the transmitting of the new process recipe to a process apparatus (operation S264), respectively, described with reference to FIG. 3. In the present embodiment, determining whether or not to perform a test process (operation S601), performing the test process (operation S610_2), the measuring of the wafer (operation S620_1), and establishing a mutual influence model (operation S630) are mainly described.

In the present embodiment, the first database 1332 of the process management system 1300 (refer to FIG. 1B) may include a first mass production database (not shown) and a first test database (not shown). The first mass production database and the first test database may be formed as a single database physically, and a detailed description thereof will be provided later.

In the determining of whether or not to perform a test process (operation S601), it is determined which one of a mass production process S610_1 and a test process S610_2 is to be performed. In the present embodiment, the mass production process S610_1 and the test process S610_2 are performed by turns. However, the mass production process S610_1 and the test process S610_2 may be simultaneously performed by separate process apparatuses (not shown).

For example, the test process S610_2 may be performed when it is determined that a process recipe, which is used in the current mass production process, is not suitable, a new process apparatus is introduced, and a new product is produced.

In the performing of the mass production process (operation S610_1), the process apparatus 1100 receives a process recipe to thereby perform a unit process on a wafer (not shown) for mass production. The process apparatus 1100 transmits a process recipe (hereinafter, a mass production process recipe) used in the performing of the mass production process (operation S610_1) to the process management system 1300, and the process management system 1300 receives the mass production process recipe and stores the received mass production process recipe in the first mass production database.

The measuring of the wafer (S620_1) may be performed to measure a certain specification (e.g., line width, thickness, uniformity, etc) of the wafer, on which the mass production process has been performed in operation S610_1. A measured value (hereinafter, referred to as a mass production measured value) obtained in the measuring of the wafer (operation S620_1) is transmitted to the process management system 1300 and is stored in the first mass production database.

A process apparatus performing the test process in the performing of the test process (operation S610_2) may be an apparatus that is the same as that performing the mass production process in the performing of the mass production process (operation S610_1). However, the inventive concept is not limited thereto, and the process apparatus performing the test process may be an apparatus that is separate from that performing the mass production process.

For convenience of explanation, a case in which the mass production process and the test process are performed by the same process apparatus that corresponds to the process apparatus 1100 described with reference to FIG. 1A is described below.

The test process in the performing of the test process (operation S610_2) may be performed based on the new process recipe transmitted to the process apparatus 1100 through the transmitting of the new process recipe to the process apparatus 1100 (operation S664). However, a process recipe that is used in the performing of the test process (operation S610_2) is not limited thereto and may be a test process recipe in which a value of a process factor is arbitrarily set by an operator.

The process apparatus 1100 transmit the process recipe (hereinafter, referred to as a test process recipe) used in the performing of the test process (operation S610_2) to the process management system 1300, and the process management system 1300 receives the test process recipe and stores the received test process recipe to the first test database.

Measuring a wafer (S620_2) may be performed to measure a certain specification (e.g., line width, thickness, uniformity, etc) of the wafer, on which the test process has been performed in operation S610_2. A measured value (hereinafter, referred to as a test measured value) obtained in the measuring of the wafer (operation S620_2) is transmitted to the process management system 1300 and is stored in the first test database.

The establishing of the mutual influence model (operation S630) may be substantially the same as the establishing of the mutual influence model (operation S130) described with reference to FIGS. 2A to 2D.

However, in the establishing of the mutual influence model (operation S630), the mutual influence model is established based on the mass production recipe stored in the first mass production database, the mass production measured value, the test process recipe stored in the first test database, and the test measured value.

When the test measured value as well as the mass production measured value are used in establishing the mutual influence model, the consistency and predictability for establishing a mutual influence model between a process recipe and a measured value may be increased.

This is not because the amount of data that is a basis for establishing the mutual influence model increases, but because a limitation on a process environment change, which may occur in the mass production process of operation S610_1, is low in the test process of the operation S610_2.

In an embodiment, if it is assumed that a process time, which is needed to form a layer having a thickness of about 100 nm in a deposition process, is about 1 minute, a limitation on a process time change may occur to obtain a thickness, which is close to about 100 nm, in the mass production process of operation S610_1. Unlike this, in the test process of operation S610_2, a process environment may be changed without regard to a process result, and thus, data that may not be obtained in the mass production process of operation S610_1 may be obtained.

Figure 7:
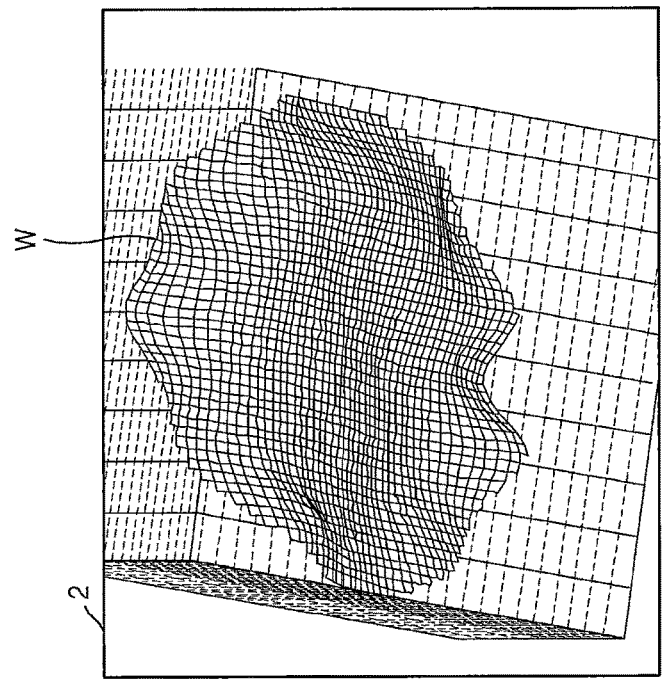
FIG. 7 is a diagram illustrating a user interface included in a process management system, according to an embodiment of the inventive concept.
Figure 7:
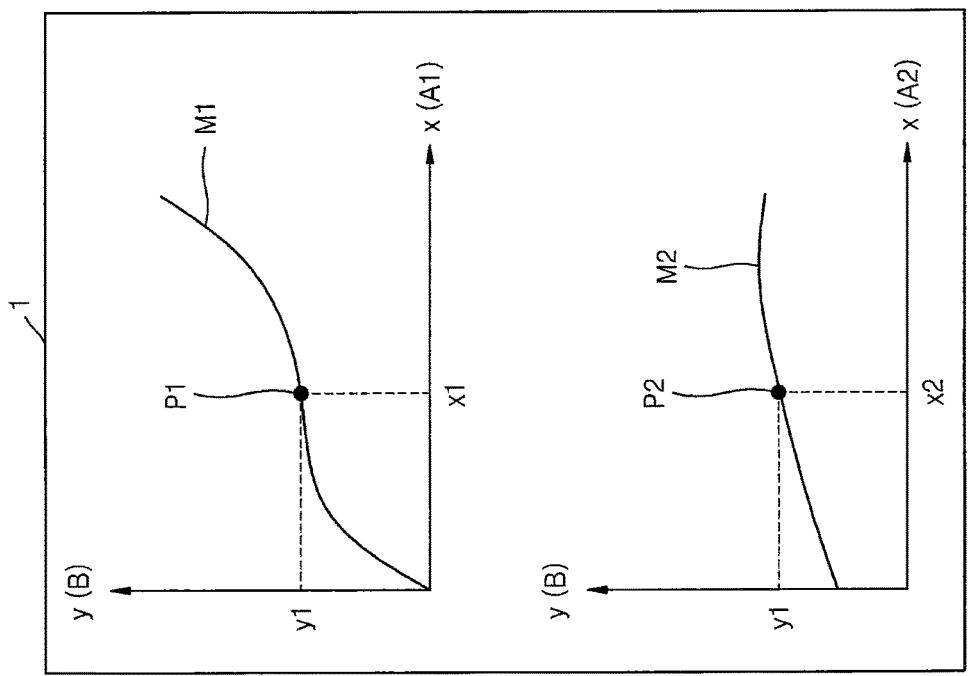

FIG. 7 is a diagram illustrating a user interface included in a process management system, according to an embodiment of the inventive concept. Below, some elements of the semiconductor manufacturing system 1000 illustrated in FIGS. 1A and 1B may be referred to describe the user interface.

Referring to FIG. 7, the user interface includes a process environment output unit 1 and a virtual wafer display unit 2.

The process environment output unit 1 may show a plurality of mutual influence models M1 and M2 between a plurality of process factors A1 and A2 and a certain specification B.

Each of the plurality of process factors A1 and A2 may be any one of a plurality of process factors (e.g., a temperature and pressure in a process apparatus, a process time, and a density of process gas) included in a process recipe. The certain specification B may be one of the specifications (e.g., line width, thickness, uniformity, etc.) of a wafer, on which a unit process has been performed.

Although the process environment output unit 1 of the present embodiment shows only two mutual influence models M1 and M2 for two process factors A1 and A2, the process environment output unit 1 may output a plurality of mutual influence models for each of the process factors included in the process recipe.

Also, the process environment output unit 1 may output new process factor values x1 and x2 of a new process recipe generated based on the mutual influence models M1 and M2. That is, the new process factor values x1 and x2 of the new process recipe may be output from a value y1 of the certain specification B and the mutual influence models M1 and M2.

Although the process environment output unit 1 of the present embodiment outputs the mutual influence models M1 and M2 and the new process factor values x1 and x2 on graphs, the inventive concept is not limited thereto. For example, the process environment output unit 1 may output process factor values and values of a certain specification through a table or the like.

The virtual wafer display unit 2 predicts a virtual wafer W when the process apparatus 1100 performs a process according to the new process recipe having the new process factor values x1 and x2, and outputs the predicted virtual wafer W.

In some embodiments, the virtual wafer W may indicate an overall appearance of a wafer, on which a unit process has been performed. In some other embodiments, the virtual wafer W may indicate a portion (e.g., a layer formed by a deposition process) of a wafer, on which a unit process has been performed.

Also, the virtual wafer display unit 2 may predict a virtual wafer W depending on a process recipe arbitrarily input by an operator besides a new process recipe generated by the recipe generator 1360 and output the predicted virtual wafer W. For example, in the case where an operator inputs an arbitrary process factor value instead of the new process factor value x1 of the new process recipe as a process factor value for the process factor A1, the virtual wafer display unit 2 predicts a virtual wafer W when the process apparatus 1100 performs a process according to the arbitrary process factor value and outputs the predicted virtual wafer W.

As described above, the appearance of the virtual wafer W is differently output depending on an input process recipe. However, on the contrary, in the case where an operator inputs a required appearance of the virtual wafer W, the process management system 1300 may generate and outputs an optimized process recipe based on the mutual influence models M1 and M2.

While the inventive concept has been particularly shown and described with reference to exemplary embodiments thereof, it will be understood that various changes in form and details may be made therein without departing from the spirit and scope of the following claims.

What is claimed is:

1. A semiconductor manufacturing system comprising:
   at least one process apparatus that is configured to receive a process recipe comprising a plurality of process factors, and perform at least one unit process;
   at least one measuring apparatus that is configured to measure a value of a specification of a wafer on which at least one unit process has been performed; and
   a process management system that is configured to manage one or more unit processes,
   wherein the process management system comprises:
   a communicator that is configured to receive the process recipe from the at least one process apparatus, and to receive a measured value of a specification of a wafer on which at least one unit process has been performed from the at least one measuring apparatus; and
   a first determination unit that is configured to establish a mutual influence model for relating effects of the plurality of process factors in the process recipe on the measured value, for use in determining if the wafer, on which at least one unit process has been performed, is defective.

2. The semiconductor manufacturing system of claim 1, wherein the process management system further comprises:
   a second determination unit that is configured to determine whether a unit process is out of specification (a spec-out), based on the measured value; and
   a third determination unit that is configured to determine a cause of the spec-out of the unit process,
   wherein a spec-out in a unit process is indicative that the wafer, on which one or more unit processes have been performed, is defective.

3. The semiconductor manufacturing system of claim 2, wherein the third determination unit comprises a defective process apparatus determination unit that is configured to determine a defective process apparatus having caused the spec-out from among one or more process apparatuses, based on the mutual influence model.

4. The semiconductor manufacturing system of claim 3, wherein the third determination unit further comprises a defective process factor determination unit that is configured to determine a defective process factor having caused the spec-out in the defective process apparatus from among the plurality of process factors in the process recipe, based on the mutual influence model.

5. The semiconductor manufacturing system of claim 4, wherein the process management system further comprises a recipe generator that is configured to generate a new process recipe based on at least one of the mutual influence model and the defective process factor.

6. The semiconductor manufacturing system of claim 5, wherein the communicator of the process management system further comprises a recipe transmitter that is configured to transmit the new process recipe to the defective process apparatus.

7. The semiconductor manufacturing system of claim 1, wherein the at least one process apparatus comprises:
   a mass production process apparatus that is configured to perform a mass production process based on a mass production process recipe; and
   a test process apparatus that is configured to perform a test process based on a test process recipe,
   wherein the first determination unit is configured to establish the mutual influence model based on the mass production process recipe, the test process recipe, a mass production measured value obtained by measuring a specification of a wafer, and a test measured value obtained by measuring a specification of a wafer.

8. The semiconductor manufacturing system of claim 1, wherein the first determination unit is configured to establish a mutual influence model between the process recipe and the measured value in the at least one unit process and accumulation process recipes and accumulation measured values, accumulated in the at least one unit process.

9. A semiconductor process management system comprising:
   a communicator that is configured to receive a process recipe comprising a plurality of process factors from at least one process apparatus, and to receive a measured value of a specification of a wafer on which at least one unit process has been performed for each sampling point from at least one measuring apparatus; and
   a first determination unit that is configured to establish a mutual influence model for relating effects of the plurality of process factors in the process recipe on the measured value for each sampling point.

10. The semiconductor process management system of claim 9, wherein the first determination unit comprises:
    a temporary determination unit that is configured to establish a temporary mutual influence model between a plurality of process factors in the process recipe and the measured value for each sampling point; and
    a reliability determination unit that is configured to determine whether the temporary mutual influence model is suitable.

11. The semiconductor process management system of claim 10, wherein the first determination unit further comprises a teaching unit that is configured to teach the temporary mutual influence model based on at least one selected from the process recipe, the measured value for each sampling point, and the mutual influence model.

12. The semiconductor process management system of claim 9, further comprising a second determination unit that is configured to determine whether a unit process performed by the at least one process apparatus is out of specification based on the measured value for each sampling point.

13. The semiconductor process management system of claim 9, further comprising a third determination unit that is configured to determine a cause of a spec-out of a unit process performed by the at least one process apparatus,
    wherein a spec-out of a unit process is indicative that the wafer, on which at least one unit process has been performed, is defective.

14. The semiconductor process management system of claim 13, wherein the third determination unit comprises:
    a defective process apparatus determination unit that is configured to determine a defective process apparatus having caused the spec-out from among one or more process apparatuses based on the mutual influence model; and
    a defective process factor determination unit that is configured to determine a defective process factor having caused the spec-out in the defective process apparatus from among a plurality of process factors in the process recipe based on the mutual influence model.

15. The semiconductor process management system of claim 14, further comprising a recipe generator that is configured to generate a new process recipe based on at least one selected from the mutual influence model and the defective process factor.

16. A semiconductor manufacturing system comprising:
    at least one process apparatus that is configured to receive a process recipe comprising a plurality of process factors and perform at least one unit process;
    at least one measuring apparatus that is configured to measure a value of a specification of a wafer on which the at least one unit process has been performed;
    a process management system that is configured to manage one unit processes; and
    a yield test apparatus that is configured to test whether the wafer is defective,
    wherein the process management system comprises:
    a communicator that is configured to receive the process recipe from the at least one process apparatus, receive a measured value from the at least one measuring apparatus, and receive a test result from the yield test apparatus; and
    a first determination unit that is configured to establish a mutual influence model for relating effects of the plurality of process factors in the process recipe on the test result and at least one selected from the process recipe and the measured value.

17. The semiconductor manufacturing system of claim 16, wherein the process management system further comprises a second determination unit that is configured to determine a cause of a defect of the wafer, based on the test result and the mutual influence model.

18. The semiconductor manufacturing system of claim 17, wherein the second determination unit comprises a defective process apparatus determination unit that is configured to determine a defective process apparatus having caused a defect from among one process apparatuses based on the mutual influence model.

19. The semiconductor manufacturing system of claim 18, wherein the second determination unit further comprises a defective process factor determination unit that is configured to determine a defective process factor having caused a defect from among a plurality of process factors included in the process recipe based on the mutual influence model.

20. The semiconductor manufacturing system of claim 19, further comprising a recipe generator that is configured to generate a new process recipe based on at least one selected from the mutual influence model and the defective process factor.

* * * * *